United States Patent
Chen

(10) Patent No.: US 7,060,959 B2
(45) Date of Patent: Jun. 13, 2006

(54) THIN IMAGE READING DEVICE HAVING REFLECTORS INSTALLED ON ONLY ONE SIDE OF A LENS

(75) Inventor: Hsi-Yu Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 106 days.

(21) Appl. No.: 10/709,201

(22) Filed: Apr. 21, 2004

(65) Prior Publication Data

US 2005/0145776 A1    Jul. 7, 2005

(30) Foreign Application Priority Data

Jan. 5, 2004    (TW) .............................. 93100169 A

(51) Int. Cl.
*H01L 27/00* (2006.01)
*H04N 1/04* (2006.01)

(52) U.S. Cl. ................... 250/208.1; 358/474; 358/475; 358/482; 358/483

(58) Field of Classification Search ................ 358/482, 358/483, 473–475, 487, 496, 497, 505, 506, 358/509, 512–514, 471, 493, 494, 486; 399/218, 399/221, 199, 201, 202, 211; 250/208.1; 347/8, 19, 105
See application file for complete search history.

(56) References Cited

U.S. PATENT DOCUMENTS

| | | | | |
|---|---|---|---|---|
| 4,751,582 A | * | 6/1988 | Koseki et al. | 358/443 |
| 5,883,727 A | * | 3/1999 | Tsai | 358/475 |
| 6,762,861 B1 | * | 7/2004 | Lan | 358/475 |

* cited by examiner

Primary Examiner—Stephone B. Allen
Assistant Examiner—Suezu Ellis
(74) Attorney, Agent, or Firm—Winston Hsu

(57) ABSTRACT

A thin image reading device includes a housing, a lens installed inside the housing for focusing light, a photosensor installed on a first side of the lens for converting light outputted from the lens into digital signals, and a plurality of reflectors installed on a second side of the lens for reflecting light inputted into the image reading device to form a linear optical path in order to guide the light to the photosensor via the lens. In addition, no reflector is installed on the first side of the lens.

18 Claims, 4 Drawing Sheets

THIN IMAGE READING DEVICE HAVING REFLECTORS INSTALLED ON ONLY ONE SIDE OF A LENS

BACKGROUND OF INVENTION

1. Field of the Invention

The present invention relates to an image reading device, and more specifically, to a thin image reading device.

2. Description of the Prior Art

In the modern age, it is important to make electronic products more compact in size. For a scanner, which scans documents and pictures, the major obstacle to compactness is the size of the scanning module. The design of the scanning module is greatly influenced by the optical path and corresponding reflector installation of the scanning module. In particular, the thickness of the scanning module is closely related to the thickness of the reflectors and their subsequent position and installation. One option to reduce the size of the scanning module is to reduce the thickness of the reflectors. However, if the reflectors are not thick enough, they may be too fragile for use, meaning that they could be broken due to collision, and thus worsening the quality of scanning. Therefore, changing the position and the installation of the reflectors is a preferable manner.

Please refer to FIG. 1 showing the optical path of a conventional scanning module 10 using four reflectors. The scanning module 10 includes a housing 12, a lens 14 for focusing light, a photosensor 16 for converting light from the lens 14 into digital signals, and four reflectors a first reflector 18, a second reflector 20, a third reflector 22 and a fourth reflector 24. The first reflector 18, the second reflector 20, and the fourth reflector 24 are installed on a first side of the lens 14, and the third reflector 22 is installed above the lens 14 on a second side.

When scanning a document, the light is reflected by the document through a slit 26 off the first reflector 18, then the second reflector 20, then the third reflector 22, then the fourth reflector 24, and finally through the lens 14 where it is focused on the photosensor 16, which converts the light into digital signals. As shown in FIG. 1, the first reflector 18, the second reflector 20, and the fourth reflector 24 are installed on the first side of the lens 14, and the third reflector 22 is installed on the second side of the lens 14. Since the third reflector 22 is installed on the opposite side of the first reflector 18, the second reflector 20, and the fourth reflector 24; it needs to be installed above the lens 14 to prevent the lens 14 from interfering with the light reflected from the second reflector 20 to the third reflector 22 and the light reflected from the third reflector 22 to the fourth reflector 24. Because the third reflector 22 is installed above the lens 14, the housing 12 of the scanning module 10 has a height at least equal to the height of the third reflector 22 plus the height of the lens 14.

Therefore, the height of the scanning module 10 can be only reduced in a limited fashion according to the prior art meaning that the thickness of the scanning module can hardly be reduced if the using the conventional installation of reflectors.

SUMMARY OF INVENTION

It is therefore a primary objective of the present invention to provide a thin image reading device in order to minimize size of an electronic product using the image reading device.

Briefly summarized, the claimed invention provides an image reading device including a housing, a lens installed inside the housing for focusing light, a photosensor installed on a first side of the lens for converting light outputted from the lens into digital signals, and a plurality of reflectors installed on a second side of the lens for reflecting light inputted into the image reading device to form a linear optical path in order to guide the light to the photosensor via the lens. In addition, no reflector is installed on the first side of the lens.

The claimed invention also provides a scanning module of a scanner including a housing, a lens installed inside the housing for focusing light, a photosensor installed on a first side of the lens for converting light outputted from the lens into digital signals, and a plurality of reflectors installed on a second side of the lens for reflecting light inputted into the scanning module to form a linear optical path in order to guide the light to the photosensor via the lens. In addition, no reflector is installed on the first side of the lens.

These and other objectives of the present invention will no doubt become obvious to those of ordinary skill in the art after reading the following detailed description of the preferred embodiments that are illustrated in the various figures and drawings.

DETAILED DESCRIPTION

The present invention provides several embodiments, wherein the reflector installation of a scanning module is changed as follows, in order to reduce the thickness of the scanning module.

Figure 1:
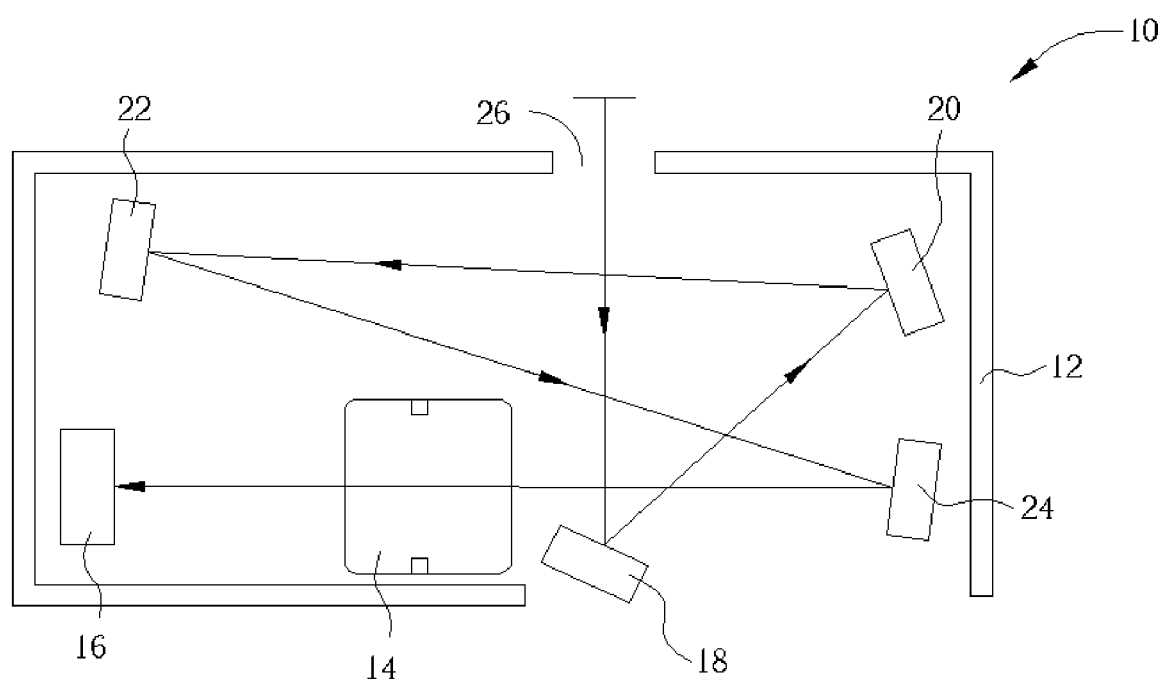
FIG. 1 illustrates the optical path of a conventional scanning module using four reflectors.
Figure 2:
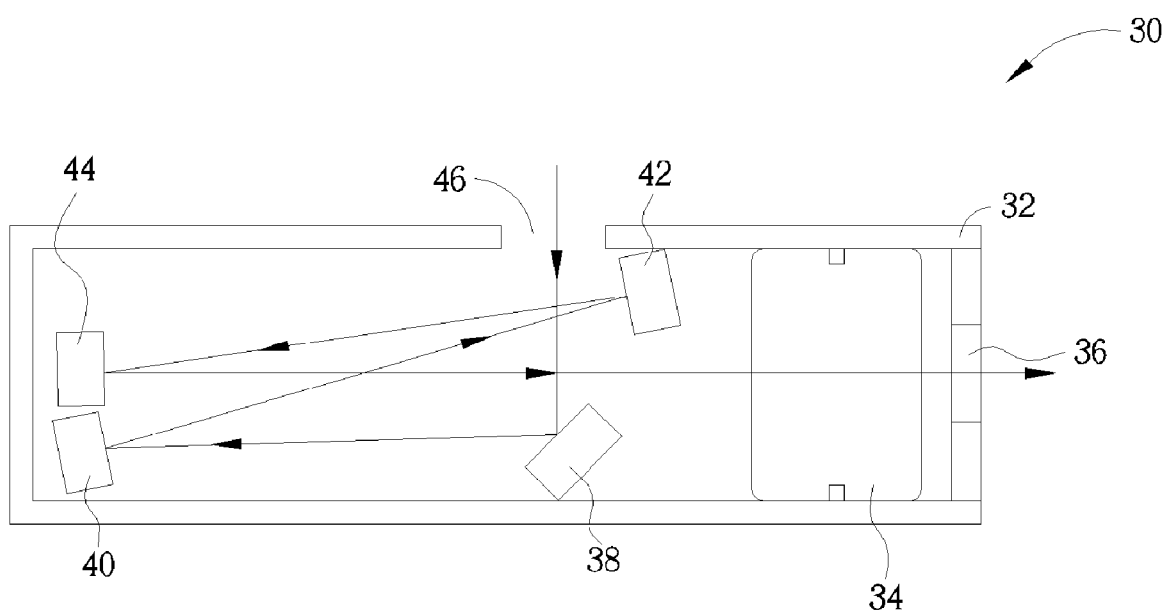
FIG. 2 illustrates a scanning module using four reflectors according to the first embodiment of the present invention.

Please refer to FIG. 2 showing a scanning module using four reflectors according to the first embodiment of the present invention. The scanning module 30 includes a housing 32, a lens 34 for focusing light, a photosensor 36 installed on a first side of the lens 34 for converting light outputted from the lens 34 into digital signals, and four reflectors a first reflector 38, a second reflector 40, a third reflector 42 and a fourth reflector 44 installed on a second side of the lens 34 for reflecting light coming from a scanned document to the lens 34. As shown in FIG. 2, when scanning a document, the light is reflected by the document through a slit 46 off the first reflector 38, then the second reflector 40, then the third reflector 42, then the fourth reflector 44, and through a space between the first reflector 38 and the second reflector 40 to the lens 34. The lens 34 then focuses the light on the photosensor 36, where it is converted into digital signals. The photosensor 36 can be a charge coupled device (CCD) or a complementary metal-oxide semiconductor (CMOS).

As shown in FIG. 2, the reflectors 38, 40, 42, 44 are all installed on the second side of the lens 34 for reflecting light coming from the scanned document. The first reflector 38 and the third reflector 42 partially cover the edge ring of the lens 34 but not the main part of the lens 34 so that the light can be still focused on the photosensor 34 by the lens 34. Moreover, the four reflectors in the present embodiment are all located on the second side of the lens 34 so that the optical path does not need to pass over or below the lens 34, and no reflector is required to be installed above or below the lens 34. Thus the thickness of the scanning module 30 can be reduced.

Figure 3:
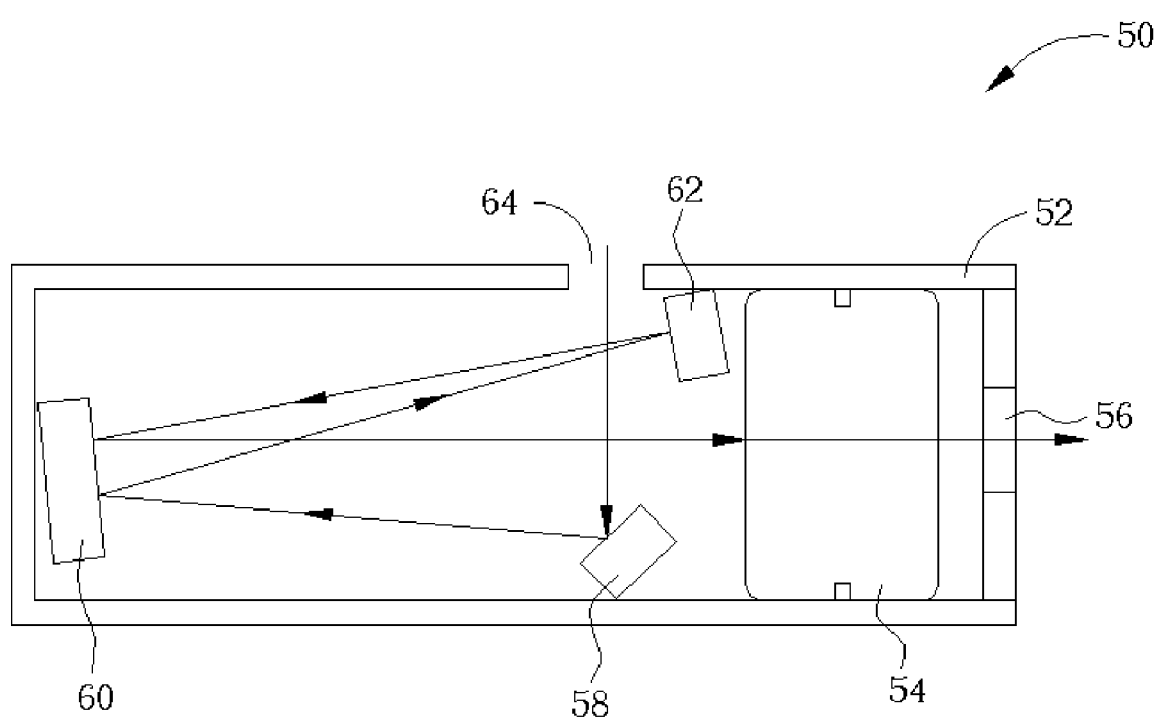
FIG. 3 illustrates a scanning module using three reflectors according to the second embodiment of the present invention.

Please refer to FIG. 3 showing a scanning module using three reflectors according to the second embodiment of the present invention. The scanning module 50 includes a housing 52, a lens 54 installed inside the housing 52 for focusing light, a photosensor 56 installed on a first side of the lens 54 for converting light outputted from the lens 34 into digital signals, and three reflectors a first reflector 58, a second reflector 60 and a third reflector 62 installed on a second side of the lens 54 for reflecting light coming from a scanned document to the lens 54. As shown in FIG. 3, when scanning a document, the light is first reflected by the document through a slit 64 off the first reflector 58, then the second reflector 60, then the third reflector 62, and then off to the second reflector 60 again before finally passing through a space between the first reflector 58 and the third reflector 62 to the lens 54. The lens 54 focuses the light on the photosensor 56 where it is converted into digital signals. As shown in FIG. 3, the reflectors 58, 60, 62 are all installed on the second side of the lens 54 for reflecting light from the document. The first reflector 58 and the third reflector 62 partially cover the edge ring of the lens 54 but not the main part of the lens 54 so that the light can be still reflected from the second reflector 60 to the lens 54. Moreover, the three reflectors are all located on the second side of the lens 54 so that the optical path does not need to pass over or below the lens 54, and no reflector is required to be installed above of below the lens 54. Thus the thickness of the scanning module 50 can be reduced.

Figure 4:
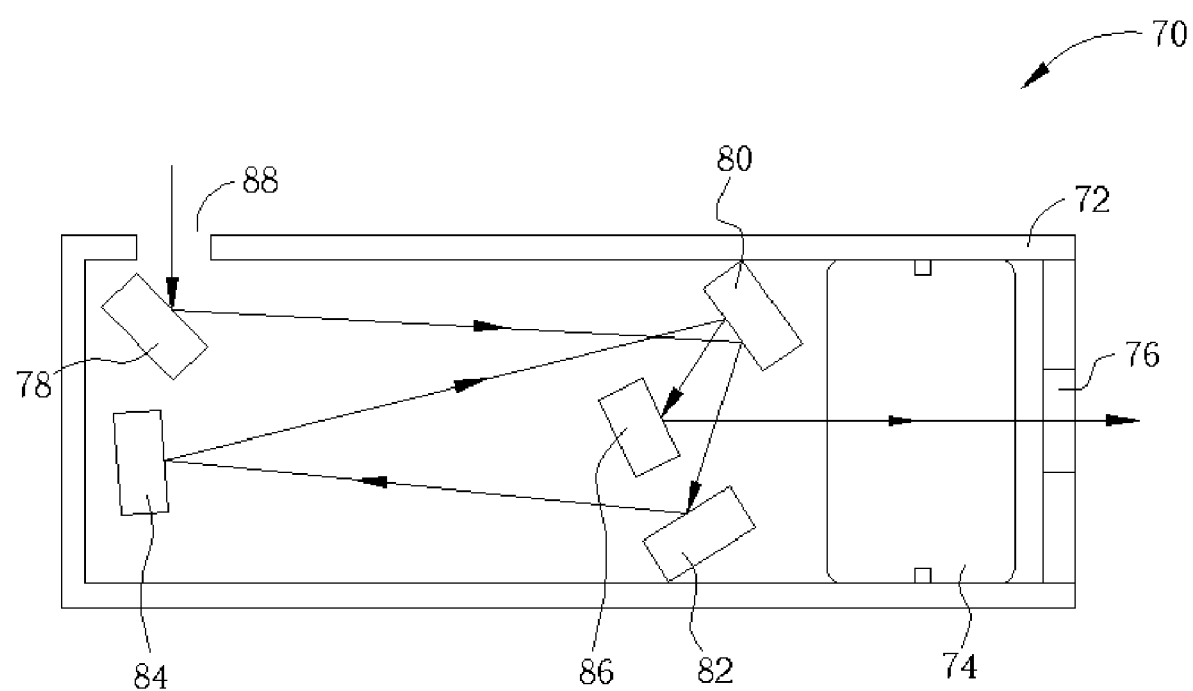
FIG. 4 illustrates a scanning module using five reflectors according to the third embodiment of the present invention.

Please refer to FIG. 4 showing a scanning module using five reflectors according to the third embodiment of the present invention. The scanning module 70 includes a housing 72, a lens 74 installed inside the housing 72 for focusing light, a photosensor 76 installed on a first side of the lens 74 for converting light from the lens 74 into digital signals, and five reflectors a first reflector 78, a second reflector 80, a third reflector 82, a fourth reflector 84 and a fifth reflector 86 installed on a second side of the lens 74 for reflecting light from a document to be scanned to the lens 74. As shown in FIG. 4, when scanning a document, the light is first reflected by the document through a slit 88 off the first reflector 78, then the second reflector 80, then the third reflector 82, then the fourth reflector 84, then off the second reflector 80 again, and then off the fifth reflector 86 before finally passing through a space between the second reflector 80 and the third reflector 82 to the lens 74. The lens 74 focuses the light on the photosensor 76 where it is converted into digital signals.

As shown in FIG. 4, the reflectors 78, 80, 82, 84, 86 are all installed on the second side of the lens 74 for reflecting light coming from the scanned document. The second reflector 80 and the third reflector 82 partially cover the edge ring of the lens 74 but not the main part of the lens 74 so that the light can be still focused on the photosensor 76 by the lens 74. Moreover, the five reflectors are all located on the second side of the lens 74 so that the optical path does not need to pass over or below the lens 74, and no reflector is required to be installed above of below the lens 74. Thus the thickness of the scanning module 70 can be reduced.

In contrast to the prior art, the reflectors of the scanning modules 30, 50, 70 according to the present invention are all installed on the second side of the lens 34, 54, 74 so that the optical path does not need to pass over or below the lens 34, 54, 74, and no reflector is required to be installed above or below the lens 34, 54, 74. Thus, the thickness of the scanning modules can be greatly reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image reading device comprising:
   a housing;
   a lens installed inside the housing for focusing light;
   a photosensor installed on a right side of the lens for converting light outputted from the lens into digital signals; and
   a plurality of reflectors installed on a left side of the lens for reflecting light inputted into the image reading device to form a linear optical path in order to guide light to the photosensor via the lens;
   wherein no reflector is installed on the right side of the lens, no reflector is located above a first plane defined by a top end of the lens, and no reflector is located below a second plane defined by a bottom end of the lens.

2. The image reading device of claim 1 wherein the linear optical path passes between two reflectors closest to the lens, and reaches the photosensor via the lens.

3. The image reading device of claim 1 wherein two reflectors closest to the lens are capable of partially covering an edge ring of the lens but not a main part of the lens for allowing light to focus on the photosensor via the lens.

4. The image reading device of claim 1 wherein the image reading device further comprises a light source for generating light.

5. The image reading device of claim 1 wherein the photosensor is a charge coupled device (CCD).

6. The image reading device of claim 1 wherein the photosensor is a complementary metal-oxide semiconductor (CMOS).

7. The image reading device of claim 1 wherein the image reading device is a scanning module of a scanner having three reflectors.

8. The image reading device of claim 1 wherein the image reading device is a scanning module of a scanner having four reflectors.

9. The image reading device of claim 1 wherein the image reading device is a scanning module of a scanner having five reflectors.

10. A scanning module of a scanner comprising:
    a housing;
    a lens installed inside the housing for focusing light;
    a photosensor installed on a right side of the lens for converting light outputted from the lens into digital signals; and
    a plurality of reflectors installed on a left side of the lens for reflecting light inputted into the scanning module to form a linear optical path in order to guide the light to the photosensor via the lens;
    wherein no reflector is installed on the right side of the lens, no reflector is located above a first plane defined by a top end of the lens, and no reflector is located below a second plane defined by a bottom end of the lens.

11. The scanning module of claim 10 wherein the linear optical path passes between two reflectors closest to the lens, and reaches the photosensor via the lens.

12. The scanning module of claim 10 wherein two reflectors closest to the lens are capable of partially covering an edge ring of the lens but not a main part of the lens for allowing light to focus on the photosensor via the lens.

13. The scanning module of claim 10 wherein the scanning module further comprises a light source for generating light.

14. The scanning module of claim 10 wherein the photosensor is a CCD.

15. The scanning module of claim 10 wherein the photosensor is a CMOS.

16. The scanning module of claim 10 wherein the scanning module comprises three reflectors.

17. The scanning module of claim 10 wherein the scanning module comprises four reflectors.

18. The scanning module of claim 10 wherein the scanning module comprises five reflectors.

\* \* \* \* \*